United States Patent
Herlihy et al.

(10) Patent No.: US 9,587,127 B2
(45) Date of Patent: Mar. 7, 2017

(54) DIGITAL PRINTING INKS

(71) Applicant: SUN CHEMICAL CORPORATION, Parsippany, NJ (US)

(72) Inventors: Shaun Lawrence Herlihy, Chatham (GB); Jason Wilber, Bath (GB); Stephen Anthony Hall, Somerset (GB); Brian Rowatt, Kent (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 14/763,698

(22) PCT Filed: Jan. 27, 2014

(86) PCT No.: PCT/US2014/013129
§ 371 (c)(1),
(2) Date: Jul. 27, 2015

(87) PCT Pub. No.: WO2014/123706
PCT Pub. Date: Aug. 14, 2014

(65) Prior Publication Data
US 2015/0361284 A1    Dec. 17, 2015

Related U.S. Application Data

(60) Provisional application No. 61/761,318, filed on Feb. 6, 2013.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/30* | (2014.01) | |
| *C09D 11/101* | (2014.01) | |
| *C08F 220/30* | (2006.01) | |
| *C08L 33/14* | (2006.01) | |
| *C08K 3/00* | (2006.01) | |
| *C08K 5/00* | (2006.01) | |

(52) U.S. Cl.
CPC ............ *C09D 11/30* (2013.01); *C08F 220/30* (2013.01); *C08K 3/0008* (2013.01); *C08K 5/0008* (2013.01); *C08L 33/14* (2013.01); *C09D 11/101* (2013.01)

(58) Field of Classification Search
CPC ..... C09D 11/101; C09D 11/30; C08F 220/30; C08F 2220/301; C08F 2220/1875; C08F 2220/282; C08K 5/0008
USPC ..... 522/18, 12, 7, 6, 71, 189, 184, 1; 520/1; 524/558, 556, 543, 572, 1, 570
See application file for complete search history.

(56) References Cited

U.S. PATENT DOCUMENTS

| | | | |
|---|---|---|---|
| 7,601,764 B2 | 10/2009 | Wu et al. | |
| 7,662,224 B2 | 2/2010 | Sloan | |
| 8,097,688 B2 | 1/2012 | Yokoi et al. | |
| 2004/0029044 A1 | 2/2004 | Severance et al. | |
| 2010/0010121 A1* | 1/2010 | Koganehira | C09D 11/322 524/90 |
| 2010/0041775 A1 | 2/2010 | Waki | |
| 2010/0272966 A1 | 10/2010 | Gould | |
| 2013/0171438 A1* | 7/2013 | Hayashi | C08F 2/44 428/220 |

FOREIGN PATENT DOCUMENTS

| | | |
|---|---|---|
| WO | 2011-162078 | * 12/2011 |
| WO | 2012/078820 | 6/2012 |
| WO | 2012/086410 | 6/2012 |

OTHER PUBLICATIONS

International Search Report issued in PCT/US2014/13129, dated May 2, 2014.
International Preliminary Report issued in PCT/US2014/013129, dated Aug. 11, 2015.
Extended European Search Report issued in European Appln. No. 14748678.1, dated Dec. 14, 2015.

* cited by examiner

*Primary Examiner* — Ling Choi
*Assistant Examiner* — Jessica E Whiteley
(74) *Attorney, Agent, or Firm* — Charles C. Achkar; Ostrolenk Faber LLP

(57) ABSTRACT

The acrylate monomers of the present invention, particularly o-phenyl phenoxyethyl acrylate, provide very fast curing, hard and solvent resistant digital printing inks, and yet are also still surprisingly flexible. These properties make for a technically superior alternative to the widely accepted very hard monomer isobornyl acrylate. O-phenyl phenoxyethyl-acrylate also has the additional benefit of being free from the strong odor associated with isobornyl acrylate.

10 Claims, No Drawings

DIGITAL PRINTING INKS

CROSS REFERENCE TO RELATED APPLICATIONS

The present application is a §371 National Phase application based on PCT/US2014/013129 filed Jan. 27, 2014, which claims the benefit of U.S. Provisional Patent Application Ser. No. 61/761,318 filed Jan. 6, 2013. All the applications are incorporated herein by reference in their entirety and for all purposes.

FIELD OF THE INVENTION

The present invention relates to printing ink compositions containing acrylate monomers, particularly o-phenyl phenoxyethyl acrylate, that are very fast curing, hard and solvent resistant, as well as flexible.

BACKGROUND OF THE INVENTION

Digital printing inks, particularly inkjet and aerosol jet inks, can be applied to a variety of substrates to fulfill different market needs. In some markets, such as graphics for banners and lorry sides, the inks are required to be very flexible, or cracking can result when the substrate is deformed. Traditional UV inkjet inks based on multifunctional monomers meet the technical needs of fast cure and good resistance properties, but are typically far too low in their flexibility and generally have poor adhesion properties to plastics, and so easily result in cracking and ink removal.

The use of very flexible inks based on monofunctional monomers is fundamentally unsatisfactory because of the very low cure speeds and the very low hardness and resistance properties that result.

Many digital printing ink manufacturers have overcome this limitation of monofunctional only inks by combining the monofunctional monomer with a material such as N-vinyl caprolactam or N-vinyl pyrollidone (EP2399965, US2012/0026235). Satisfactory properties can also be achieved by further using a mixture of monofunctional and multifunctional monomers, as defined in WO2005/026270.

However, such approaches using monofunctional monomer technology have the limitation that the resultant inks are inherently thermoplastic and still prone to blocking or set-off in a stack in the most demanding applications.

It is well known by those skilled in the art in the field of UV inkjet inks that the UV monomer isobornyl acrylate is particularly useful in combating this effect as it has a high glass transition temperature (Tg) when cured, making it appear particularly hard and scratch resistant (US2012/0026235). However, these useful properties are countered by a well-known strong odor, often precluding its use. Similar hard acrylate monomer structures useful in UV monofunctional type ink-jet inks are defined in US2009/0087576, although the levels here are preferably above 40 wt % in the formulation to achieve satisfactory results.

Alternatively, EP2399965 describes the use of a mixture comprising 10-35% of a cyclic monofunctional acrylate where the homopolymer has a Tg>20° C., 10-30% of an N-vinyl lactam and/or a vinyl ether acrylate, and 10-30% of an ethoxylated and/or propoxylated polyacrylate having a molecular weight of at least 450. In this case, the cyclic monofunctional acrylate is preferred to be 4-tert.butylcyclohexylacrylate or isobornyl acrylate.

What is clear is that there is no suitable approach to producing fast curing inkjet inks which have good adhesion, flexibility and particularly a high surface hardness which prevents them from blocking in a stack or causing ink color to be transferred to the reverse of an adjacent sheet in a stack or to the reverse of the next layer within a roll.

What the present invention discloses, which is surprising and unobvious, is that the use of the acrylate monomer as defined in Formula (I) or Formula (A) below, and in particular o-phenyl phenoxyethyl acrylate, which in itself does not have a particularly high Tg value, as a component in UV ink jet compositions, leads to an ink which has very high hardness and blocking resistance. These properties are superior even to isobornyl acrylate, with the added advantages of substantially reduced odor. Other key properties of the cured inks such as adhesion and flexibility are also maintained using this material.

As discussed below, the prior art does not disclose the use of a material of formula (A) or formula (I) as a stand-alone component of printing ink compositions.

For instance, JP2011178981 discloses inkjet recording ink compositions capable of providing high quality, glossy recorded matters on recording media with low ink absorption. Ethoxylated phenyl phenoxyethyl acrylate is used but only as part of a copolymerization resin and not in its free form.

EP2343345 discloses ink compositions for inkjet recording that can provide a high-quality recorded matter on various recording media, especially, even on a recording medium having a low ink-absorbing property, such as synthetic paper printing or offset printing paper. The inkjet compositions disclosed contain an ethoxylated phenyl phenoxyethyl acrylate as part of a resin and not in its monofunctional acrylate monomer state.

US2010001021 discloses ink compositions with improved storage stability and anticlogging properties. These ink compositions contain an oxyethyl acrylate resin which is a resin that contains approximately 75% by weight of a monomer having an oxyethyl acrylate structure represented by CAS No. 72009-86-0 and that has a molecular weight of 6900. Accordingly, the ethoxylated phenyl phenoxyethyl acrylate monomer is part of an acrylic copolymer and not used in its free form.

SUMMARY OF THE INVENTION

The present invention provides a printing ink composition comprising a colorant and a material of polyethylene glycol o-phenyl phenyl ether acrylate (CAS 72009-86-0) of formula (A):

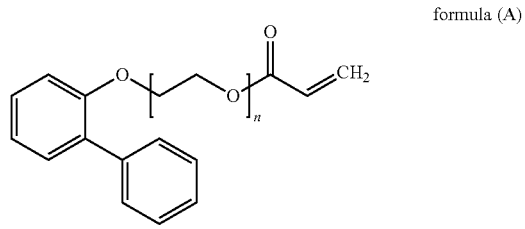

formula (A)

wherein, n is 1-3, or a material of formula (I):

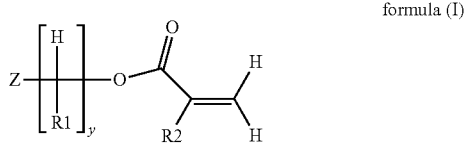

formula (I)

wherein:

$R^1$ is selected from the group consisting of: hydrogen, methyl and a hydroxyl group;

$R^2$ is either a hydrogen or a methyl group;

y is 1 to 6; and

Z is selected from the group consisting of: formula (II), (III) and (IV):

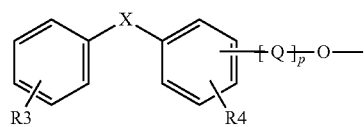

formula (II)

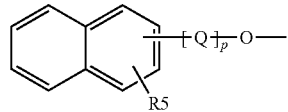

formula (III)

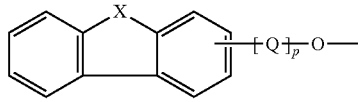

formula (IV)

wherein:

X is selected from the group consisting of: a direct bond, O, $CH_2$, $C(CH_3)_2$ and C=O;

p is 0 or 1;

Q is CH2 or C=O;

$R^3$ and $R^4$ are selected from the group consisting of H, phenyl, dimethyl benzyl, $C_1$-$C_8$ alkyl group and $C_1$-$C_8$ alkoxy group, or alternatively $R^3$ and $R^4$ are joined to form a fused ring with the benzene rings to which they are attached; and $R^5$ is —C(O)O$R^6$, wherein $R^6$ is phenyl or $C_1$-$C_8$ alkyl.

The present invention also provides a printed article comprising the printing ink composition of the present invention.

The present invention further provides a method of printing a printing ink composition comprising applying to a substrate the printing ink composition of the present invention.

These and other objects, advantages, and features of the invention will become apparent to those persons skilled in the art upon reading the details of the methods and formulations as more fully described below.

DETAILED DESCRIPTION OF THE INVENTION

The acrylate monomers of the present invention, particularly o-phenyl phenoxyethyl acrylate, provide very fast curing, hard and solvent resistant digital printing inks, and yet are also still surprisingly flexible. These properties make for a technically superior alternative to the widely accepted very hard monomer isobornyl acrylate. O-phenyl phenoxyethylacrylate also has the additional benefit of being free from the strong odor associated with Isobornyl acrylate.

The use of the aforementioned monomers in inkjet products allows for significant enhancement of the mechanical properties of the cured ink relative to existing, commonly used materials and significantly closes the gap between what is technically possible for monofunctional style inks and what is possible for multifunctional style inks, having potential applicability in both types.

The energy curable inks of the present invention show a reduced tendency to 'block' or to transfer color in a stack or reel by virtue of being very hard and fast curing. Unusually this does not come at the expense of either the flexibility or the adhesion. The inks contain 0.1-75% of a material defined in formula (I), and in particular o-phenyl phenoxyethyl acrylate, preferably at 1-40% and most preferably at 1-30% along with other monofunctional or multifunctional acrylate monomers dependent on the balance of properties being sought. In addition, the formulations may contain vinyl materials such as N-vinyl pyrollidone, N-vinyl caprolactam, vinyl ethers and styrene.

The present invention is drawn to a printing ink, preferably a digital printing ink comprising a colorant, a material of formula (A) and/or a material of formula (I) which is very effective in providing fast curing and an unusually hard surface which makes the inks far more resistant to blocking/setting off in a stack or reel. The inks also maintain good flexibility and adhesion properties.

The material of formula (A) (CAS 72009-86-0) is as follows:

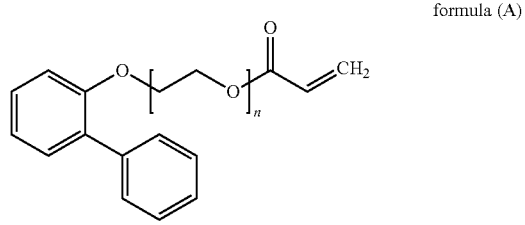

formula (A)

wherein, n is 1-3.

The material of formula I is as follows:

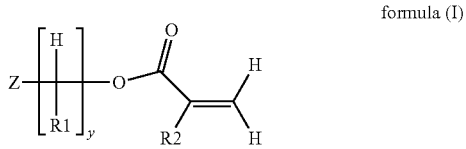

formula (I)

wherein:

$R^1$ is selected from the group consisting of: hydrogen, methyl and a hydroxyl group;

$R^2$ is either a hydrogen or a methyl group;

y is 1 to 6; and

Z is selected from the group consisting of: formula (II), (III) and (IV):

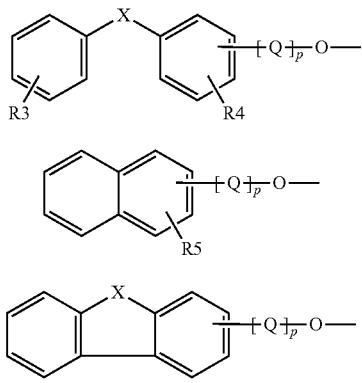

formula (II)

formula (III)

formula (IV)

wherein:

X is selected from the group consisting of: a direct bond, O, $CH_2$, $C(CH_3)_2$ and C=O;

p is 0 or 1;

Q is CH2 or C=O;

$R^3$ and $R^4$ are selected from the group consisting of H, phenyl, dimethyl benzyl, $C_1$-$C_8$ alkyl group and $C_1$-$C_8$ alkoxy group, or alternatively $R^3$ and $R^4$ are joined to form a fused ring with the benzene rings to which they are attached; and $R^5$ is —C(O)O$R^6$, wherein $R^6$ is phenyl or $C_1$-$C_8$ alkyl.

The preferred material of formula (A) and of formula (I) is o-phenyl phenoxyethyl acrylate (CAS 91442-24-9):

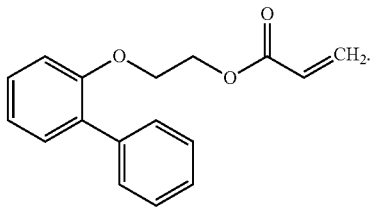 [SMILES: C=CC(=O)OCCOc1ccccc1-c1ccccc1]

In one embodiment, the printing ink of the present invention is a digital printing ink composition comprising: (a) a material according to formula (A) and/or formula (I); (b) a photoinitiator; and (c) a colorant. Preferably, the total photoinitiator content in such a composition is from 1-15% by weight based on the total weight of the ink.

In another embodiment, the digital printing ink composition of the present invention comprises a material of formula (A) and/or formula (I) present in an amount between 0.1-75%, preferably between 1-40%, more preferably 1-30% by weight of the total weight of the ink.

In a preferred embodiment, the printing ink of the present invention is an aerosol jet ink.

It is understood that the inks of the present formulation could contain virtually any raw materials that are compatible with energy curable ink systems. A partial list of some of the classes of materials that could be used to formulate the inks of the present invention are included below.

Examples of suitable monofunctional ethylenically unsaturated monomers include but are not limited to the following (and combinations thereof): 2(2-ethoxyethoxy) ethyl acrylate; 2-phenoxyethyl acrylate; 2-phenoxyethyl methacrylate; $C_{12}$/$C_{14}$ alkyl methacrylate; $C_{16}$/$C_{18}$ alkyl acrylate; $C_{16}$/$C_{18}$ alkyl methacrylate; caprolactone acrylate; cyclic trimethylolpropane formal acrylate; ethoxylated (4) nonyl phenol acrylate; isobornyl acrylate; isobornyl methacrylate; isodecyl acrylate; lauryl acrylate; methoxy polyethylene glycol (350) monomethacrylate; $C_8$/$C_{10}$ alkyl acrylate; polypropylene glycol monomethacrylate; stearyl acrylate; tetrahydrofurfuryl acrylate; tetrahydrofurfuryl methacrylate; tridecyl acrylate; 2-(phenylthio)ethyl acrylate; 2-carboxyethyl acrylate; 2-hydroxy-3-phenoxypropyl acrylate; 2-isocyanato ethyl acrylate; 2-methoxyethyl acrylate; 3,3,5-trimethylcyclohexane acrylate; 4-hydroxy butyl acrylate; 4-t.butyl cyclohexyl acrylate; acrylate ester of t.butyl decanoate; acetoacetoxy ethyl acrylate; acryloyl oxyethyl hydrogen succinate; alkoxylated lauryl acrylate; alkoxylated tetrahydrofurfuryl acrylate; behenyl acrylate; benzyl acrylate; cumyl phenoxyethyl acrylate; cyclohexyl acrylate; dicyclopentanyl acrylate; dicyclopentenyloxyethyl acrylate; dicyclopentyl acrylate; diethyleneglycol butyl ether acrylate; dihydrodicyclopentadienyl acrylate; dimethyl aminoethyl acrylate; ethoxylated ethyl hexyl acrylate; ethoxylated methoxy polyethylene glycol acrylate; ethoxylated phenol acrylate; ethoxylated tristyryiphenol acrylate; iso-nonyl acrylate; iso-octyl acrylate; iso-stearyl acrylate; methoxy triethylene glycol acrylate; N-(acryloyloxyethyl)hexahydrophthalimide; N-acryloylmorpholine; N-butyl 1,2 (acryloyloxy) ethyl carbamate; n-octyl acrylate; polyethylene glycol monoacrylate; polypropylene glycol monoacrylate; and tripropyleneglycol monomethyl ether acrylate.

Examples of Suitable polyfunctional ethylenically unsaturated monomers include but are not limited to the following (and combinations thereof): 1,3-butylene glycol dimethacrylate; 1,4-butanediol dimethacrylate; 1,6 hexanediol diacrylate; 1,6 hexanediol dimethacrylate; diethylene glycol dimethacrylate; dipropylene glycol diacrylate; ethoxylated (10) bisphenol a diacrylate; ethoxylated (2) bisphenol a dimethacrylate; ethoxylated (3) bisphenol a diacrylate; ethoxylated (3) bisphenol a dimethacrylate; ethoxylated (4) bisphenol a diacrylate; ethoxylated (4) bisphenol a dimethacrylate; ethoxylated bisphenol a dimethacrylate; ethoxylated (10) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris(2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; 1,10 decanediol diacrylate; 1,3-butylene glycol diacrylate; 1,4-butanediol diacrylate; 1,9-nonanediol diacrylate; 2-(2-Vinyloxyethoxy)ethyl acrylate; 2-butyl-2-ethyl-1,3-propanediol diacrylate; 2-methyl-1,3-propanediol diacrylate; 2-methyl-1,3-propanediyl ethoxy acrylate; 3 methyl 1,5-pentanediol diacrylate; alkoxylated cyclohexane dimethanol diacrylate; alkoxylated hexanediol diacrylate; cyclohexane dimethanol diacrylate; ethoxylated cyclohexane dimethanol diacrylate; diethyleneglycol diacrylate; dioxane glycol diacrylate; ethoxylated dipentaerythritol hexaacrylate; ethoxylated glycerol triacrylate; ethoxylated neopentyl glycol diacrylate; hydroxypivalyl hydroxypivalate diacrylate; neopentyl glycol diacrylate; poly (tetramethylene glycol) diacrylate; polypropylene glycol 400 diacrylate; polypropylene glycol 700 diacrylate; propoxylated (6) ethoxylated bisphenol A diacrylate; propoxylated ethylene glycol diacrylate; propoxylated (5) pentaerythritol tetraacrylate; and propoxylated trimethylol propane triacrylate.

The formulation of the present invention may also contain other types of monomers including N-vinyl amides. Examples of N-vinyl amides include but are not limited to N-vinylcaprolactam (NVC) and N-vinyl pyrollidone (NVP). NVC is particularly preferred.

Suitable photoinitiators include but are not limited to the following (and combinations thereof):

(A) α-hydroxyketones, including but not limited to 1-hydroxy-cyclohexyl-phenyl-ketone; 2-hydroxy-2-methyl-1-phenyl-1-propanone; 2-hydroxy-1-{4-[4-(2-hydroxy-2-methyl-propionyl)-benzyl]-phenyl}-2-methyl-propan-1-one; and 2-hydroxy-1-[4-(2-hydroxyethoxy)phenyl]-2-methyl-1-propanone.

(B) Acylphosphine oxides including but not limited to 2,4,6-trimethylbenzoyl-diphenylphosphine oxide; 2,4,6-trimethylbenzoyl-diphenyl phosphinate; and bis(2,4,6-trimethylbenzoyl)-phenylphosphineoxide.

(C) α-aminoketones including but not limited to 2-methyl-1-[4-(methylthio)phenyl]-2-morpholinopropan-1-one; 2-benzyl-2-dimethylamino-1-(4-morpholinophenyl)-butanone-1; and 2-dimethylamino-2-(4-methyl-benzyl)-1-(4-morpholin-4-yl-phenyl)-butan-1-one.

Examples of other suitable photoinitiators include benzil dimethyl ketal; thioxanthone initiators 2-4-diethylthioxanthone; isopropylthioxanthone; 2-chlorothioxanthone; 1-chloro-4-propoxythioxanthone; benzophenone initiators benzophenone; 4-phenylbenzophenone; 4-methylbenzophenone; methyl-2-benzoylbenzoate; 4-benzoyl-4-methyldphenyl sulphide; phenylglyoxylate initiators phenyl glyoxylic acid methyl ester; oxy-phenyl-acetic acid 2-[2-hydroxyethoxy]-ethyl ester or oxy-phenyl-acetic acid 2-[2-oxo-2-phenyl-acetoxy-ethoxy]-ethyl ester; and titanocen radical initiator titanium bis(η5-2,4-cyclopentadien-1-yl)bis[2,6-difluoro-3-(1h-pyrrol-1-yl)phenyyl], oxime ester radical initiators [1-(4-phenylsulfanylbenoyl)heptylideneamino]benzoate or [1-[9-ethyl-6-(2-methylbenzoyl)carbazol-3-yl]ethylideneamino]acetate plus others including methyl benzoylformate; 1-phenyl-1,2-propanedione-2-(o-ethoxycarbonyl)oxime, 4,4,4-(hexyamethyltriamino)triphenyl methane; 2-benzyl-2-dimethylamino-4-morpholinobutyrophenone; 2-methyl-1-(4-methylthiophenyl)-2-morpholineopropan-1-one; 4,4-bis(diethylamino)benzophenone; and 2-ethyl anthraquinone.

Polymeric photoinitiators are also suitable including, for example, polymeric aminobenzoates (GENOPOL AB-1 or AB-2 from Rahn, Omnipol ASA from IGM or Speedcure 7040 from Lambson), polymeric benzophenone derivatives (GENOPOL BP-1 from Rahn, Omnipol BP from IGM or Speedcure 7005 from Lambson); and polymeric thioxanthone derivatives (GENOPOL TX-1 from RAHN, Omnipol TX from IGM or Speedcure 7010 from Lambson).

An amine synergist may also be included in the ink formulation, suitable examples include, but are not limited to the following (and combinations thereof): Ethyl-4-(dimethlamino)benzoate, 2-ethylhexyl-4-(dimethylamino)benzoate, 2-(dimethylamino)ethylbenzoate, poly[oxy(methyl 1,2-ethanediyl)], a-[4-(dimethylamino)benzoyl-a-butoxy, butoxyethyl-4-(dimethylamino)benzoate plus EBECRYL® 80/81/83, EBECRYL® LEO 10551/10552/10553, EBECRYL® 7100, and EBECRYL® P116 available from CYTEC; CN 501, 503, 550, CN UVA421, CN 341, 3705, 3715, 3735, 3755, 381, 384, 584, 554 all available from SARTOMER; GENOMER 5142, 5161, 5275 FROM RAHN; PHOTOMER 4771, 4779F, 4967F, 4968F, 5006F, 4775F, 5960F, LAROMER LR 8996, LAROMER PO 94F AND LAROMER P077F all available from BASF; OMNIRAD CI-250 and OMNILANE A1230C FROM IGM RESINS; and DESMOLUX VPLS 2299 from BAYER COATINGS.

Included in the ink formulation can optionally be a suitable de-aerator, these prevent the formation of air inclusions and pinholes in the cured coating. These also reduce rectified diffusion, which can cause reliability issues in the printhead. Examples include the following products available from EVONIK: TEGO AIREX900, 910, 916, 920, 931, 936, 940, 944, 945, 950, 962, 980, 986.

Defoamers can also optionally be included in the formulation. These prevent the formation of foam during manufacture of the ink and also while jetting. These are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354.

Surface Control Additives are often optionally used to control the surface tension of the ink which is required to adjust the wetting on the face plate of the printhead and also to give the desired drop spread on the substrate or in the case of multi pass inkjet printing, wet on dry drop spread. They can also be used to control the level of slip and scratch resistance of the coating. Examples of suitable surface control additives include but are not limited to TEGO FLOW300, 370, 425, TEGO GLIDE 100, 110, 130, 406, 410, 411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260, 265, 270, 280, 500, 505, 510 and TEGO WET KL245, all available from EVONIK. Available from BYK are BYK 333, 337, BYK UV3500, BYK 378, 347, 361, BYK UV3530, 3570, CERAFLOUR 998, 996, NANOBYK 3601, 3610, 3650 and CERMAT 258. From CYTEC, EBECRYL® 350, 1360, MODAFLOW 9200, EBECRYL® 341 may be used. From SARTOMER the aliphatic silicone acrylate CN9800 may also be used.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International according to the following trade designations, blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; and black pigments.

The pigments are milled to typically less than 1 micrometer after milling with a preferred particle size distribution of 10-500 nm, more preferably 10-350 nm to have better transparency and a wide color gamut. The pigment dispersion will typically contain 60-90% monomer which can be a mono or multifunctional (meth)acrylate monomer, with added stabilizer, inhibitor, dispersant and optionally a pigment additive/synergist and/or a wetting additive/oligomer/resin. The ratio of pigment to dispersant would usually be 1:2 to 9:1 depending on the chemistry of the pigment and dispersant. Typical dispersants would include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from LUBRIZOL. Examples of additive/synergists to aid dispersion stability include SOLSPERSE 5000, 12000 and 22000 from LUBRIZOL.

The curing of the inks of the present invention normally requires a traditional mercury vapor discharge lamp to generate UV radiation for initiating the cure of energy curable inkjet inks. Solid state UV radiation sources such as UV light emitting diodes (LEDs) can also be used as the source of UV radiation. Mercury lamps also take time to heat up and cool down and have the potential to release mercury, which is highly toxic. UV LEDs can be rapidly switched on and off, are more energy efficient and don't generate heat, so are better for use with heat sensitive substrates. This is leading to a movement towards UV LED formulations, which can be more sensitive to issues with stray light as they contain photoinitiators with spectral absorbance in the UVA region of the electromagnetic spectrum. The inks of the present invention could also be formulated to cure by other radiation sources, such as for example microwave, infrared, electron beam, visible light, x-ray, etc.

The following examples illustrate specific aspects of the present invention and are not intended to limit the scope thereof in any respect and should not be so construed Example 1

Synthesis of 2-(4-phenylphenoxyl)ethan-1-ol

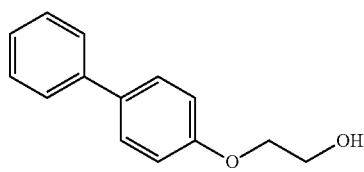 [SMILES: OCCOc1ccc(-c2ccccc2)cc1]

20.0 g 4-hydroxy biphenyl (0.11765 moles), 9.412 g sodium hydroxide (0.2353 moles) and 150 ml of water were mixed in a two necked round bottomed flask fitted with a condenser and magnetic stirrer and heated to 100° C. until all of the solids had dissolved. The mixture was then cooled to 60° C. and 18.94 g of 2-chloroethanol (0.2353 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 18.53 g (73.6%) of a white solid. The product was analyzed by NMR and FT-IR.

Example 2

Synthesis of 2-(4-phenylphenoxyl)ethyl prop-2-enoate

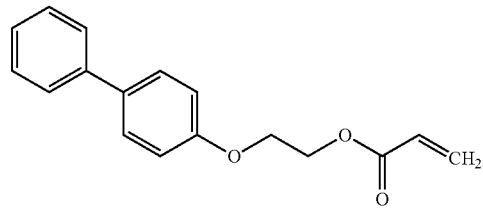 [SMILES: C=CC(=O)OCCOc1ccc(-c2ccccc2)cc1]

8.0 g of the product from Example 1 (0.03738 moles), 2.96 g of acrylic acid (0.04112 moles), 20 ml of toluene, 0.04 g of p-toluene sulphonic acid and 0.04 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 10.0 g (99.8%) of a light grey solid. The product was analysed by NMR and FT-IR.

Example 3

Synthesis of 2-(naphthalen-1-yloxy)ethan-1-ol

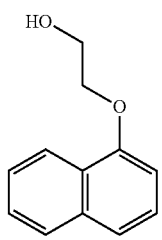 [SMILES: OCCOc1cccc2ccccc12]

20.0 g 1-naphthol (0.1387 moles), 11.1 g sodium hydroxide (0.2775 moles) and 150 ml of water were mixed in a two necked round bottomed flask fitted with a condenser and magnetic stirrer and heated to 100° C. until all of the solids had dissolved. The mixture was then cooled to 60° C. and 22.335 g of 2-chloroethanol (0.2775 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 24.0 g (91.9%) of a brown liquid. The product was analysed by NMR and FT-IR.

Example 4

Synthesis of 1-(naphthalene-1-yloxy) ethyl prop-2-enoate

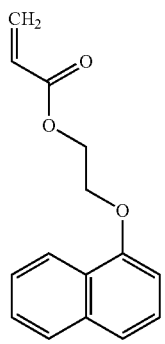 [SMILES: C=CC(=O)OCCOc1cccc2ccccc12]

20.0 g of the product from Synthesis example 3 (0.1064 moles), 8.426 g of acrylic acid (0.117 moles), 50 ml of toluene, 0.104 g of p-toluene sulphonic acid and 0.104 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 21.7 g (84.27%) of a light brown liquid. The product was analysed by NMR and FT-IR.

Example 5

Synthesis of 2-(4-benzoylphenoxyl)ethan-1-ol

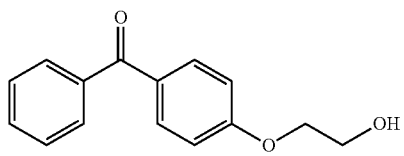 [SMILES: O=C(c1ccccc1)c1ccc(OCCO)cc1]

19.8 g 4-hydroxybenzophenone (0.1 moles), 8.0 g sodium hydroxide (0.2 moles) and 150 ml of water were mixed in a two necked round bottomed flask fitted with a condenser and magnetic stirrer and heated to 100° C. until all of the solids had dissolved. The mixture was then cooled to 60° C. and 16.1 g of 2-chloroethanol (0.2 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 20.0 g (82.64%) of a white solid. The product was analysed by NMR and FT-IR.

Example 6

Synthesis of 2-(4-benzoylphenoxyl)ethyl prop-2-enoate

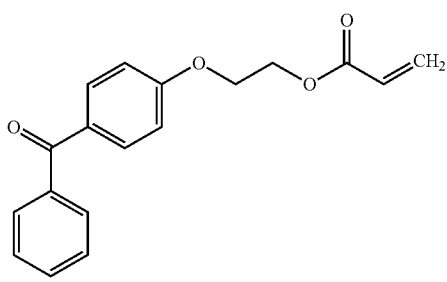 [SMILES: C=CC(=O)OCCOc1ccc(C(=O)c2ccccc2)cc1]

15.0 g of the product from Synthesis example 5 (0.06198 moles), 4.91 g of acrylic acid (0.068182 moles), 40 ml of toluene, 0.08 g of p-toluene sulphonic acid and 0.08 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 16.0 g (87.21%) of a light yellow liquid. The product was analysed by NMR and FT-IR.

Example 7

Synthesis of 2(4-phenoxyphenoxy)ethan-1-ol

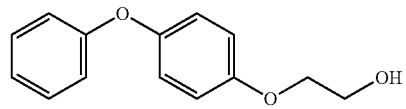 [SMILES: OCCOc1ccc(Oc2ccccc2)cc1]

15.0 g 4-phenoxy phenol (0.080645 moles), 6.45 g sodium hydroxide (0.16125 moles) and 150 ml of water were mixed in a two necked round bottomed flask fitted with a condenser and magnetic stirrer and heated to 100° C. until all of the solids had dissolved. The mixture was then cooled to 60° C. and 12.984 g of 2-chloroethanol (0.16129 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 16.0 g (86.26%) of a light brown solid. The product was analysed by NMR and FT-IR.

Example 8

Synthesis of 2-(4-phenoxyphenoxyl)ethyl prop-2-enoate

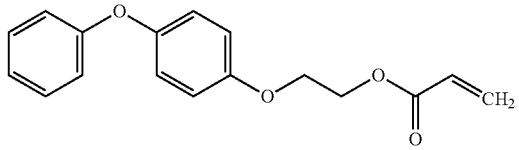 [SMILES: C=CC(=O)OCCOc1ccc(Oc2ccccc2)cc1]

14.0 g of the product from Synthesis example 7 (0.06087 moles), 4.82 g of acrylic acid (0.06696 moles), 50 ml of toluene, 0.08 g of p-toluene sulphonic acid and 0.08 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 17.0 g (98.34%) of a light yellow liquid. The product was analysed by NMR and FT-IR.

Example 9

Synthesis of 2-(4-phenylbenzoyloxy)ethyl prop-2-enoate

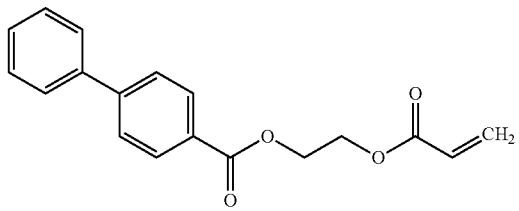 [SMILES: C=CC(=O)OCCOC(=O)c1ccc(-c2ccccc2)cc1]

10.72 g of 2-hydroxyethyl acrylate (0.0924 moles), 9.33 g triethylamine (0.0924 moles) and 50 ml of dichloromethane were mixed in a 2-necked round bottomed flask equipped with a stirrer and nitrogen inlet/outlet. The mixture was cooled to <10° C. using an ice/water bath and 20.0 g of biphenyl-4-carbonyl chloride (0.0924 moles) in 75 ml of dichloromethane were added drop-wise with constant stirring. The mixture was kept at <10° C. throughout the addition. Once the addition was complete the mixture was allowed to warm to room temperature. The mixture was then transferred to a separating flask and washed with 2×100 ml 0.1M hydrochloric acid, 2×100 ml 0.1M sodium hydroxide and 2×100 ml of water. The organics were then dried using anhydrous magnesium sulphate and the solvent removed using a rotary evaporator to yield the product. The yield was 24.7 g (90.31%) of a light brown solid. The product was analysed by NMR and FT-IR.

Example 10

Synthesis of 2-[4-(2-phenylpropan-2-yl)phenoxy]ethan-1-ol

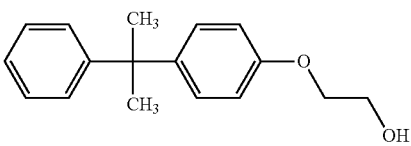 [SMILES: CC(C)(c1ccccc1)c1ccc(OCCO)cc1]

20.0 g cumyl phenol (0.0942 moles), 7.54 g sodium hydroxide (0.1885 moles) and 150 ml of water were mixed in a two necked round bottomed flask fitted with a condenser and magnetic stirrer and heated to 100° C. until all of the solids had dissolved. The mixture was then cooled to 60° C. and 15.17 g of 2-chloroethanol (0.1884 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 20.0 g (82.80%) of a light yellow liquid. The product was analysed by NMR and FT-IR.

Example 11

Synthesis of 2-[4-(2-phenylpropan-2-yl)phenoxy]ethyl prop-2-enoate

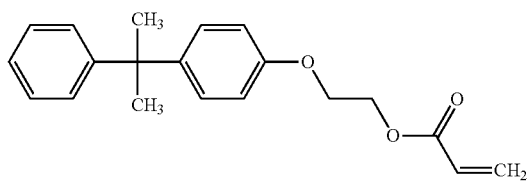 [SMILES: C=CC(=O)OCCOc1ccc(C(C)(C)c2ccccc2)cc1]

15.0 g of the product from Synthesis example 10 (0.0586 moles), 4.641 g of acrylic acid (0.064453 moles), 40 ml of toluene, 0.1 g of p-toluene sulphonic acid and 0.1 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 14.3 g (78.7%) of a light yellow liquid. The product was analysed by NMR and FT-IR.

Example 12

Synthesis of 2-(naphthalene-2-yloxy) ethan-1-ol

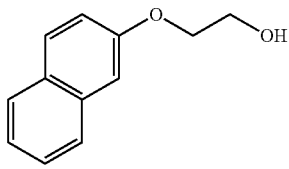 [SMILES: OCCOc1ccc2ccccc2c1]

20.0 g 2-naphthol (0.1387 moles), 11.1 g sodium hydroxide (0.27745 moles) and 150 ml of water were mixed in a two necked round bottomed flask fitted with a condenser and magnetic stirrer and heated to 100° C. until all of the solids had dissolved. The mixture was then cooled to 60° C. and 22.34 g of 2-chloroethanol (0.27745 moles) were added and the mixture heated at 50-60° C. with stirring for 3½ hours. The mixture was then cooled to room temperature and 200 ml of dichloromethane was added. The mixture was added to a separating flask and the mixture was allowed to separate. The organic phase was collected and dried with anhydrous magnesium sulphate. The solvent was then removed using a rotary evaporator to yield the product. The yield was 24.0 g (92.04%) of a light brown solid. The product was analysed by NMR and FT-IR.

Example 13

Synthesis of 2-(naphthalene-2-yloxy)ethyl prop-2-enoate

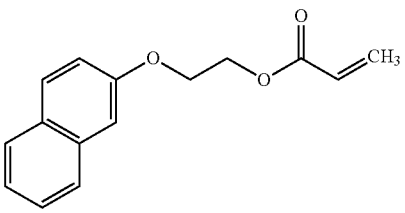 [SMILES: C=CC(=O)OCCOc1ccc2ccccc2c1]

15.0 g of the product from Example 12 (0.079787 moles), 6.32 g of acrylic acid (0.087766 moles), 40 ml of toluene, 0.1 g of p-toluene sulphonic acid and 0.1 g of p-methoxy phenol were mixed in a flask with a Dean and Stark apparatus attached. The mixture was heated to reflux for a total of 20 hours. Air was blown through the reaction mixture throughout the reaction. The mixture was then cooled to room temperature and 50 ml of toluene was added. The mixture was then extracted with 100 ml of 10% aqueous potassium carbonate and then 2×100 ml of water. The organic phase was then dried with anhydrous magnesium sulphate and the solvent removed using a rotary evaporator to yield the product. The yield was 17.5 g (90.63%) of a light grey solid. The product was analysed by NMR and FT-IR.

Example 14

Properties of Monofunctional Type Ink-jet Inks Containing Materials According to Formula (A) and/or Formula (I)

Cyan inkjet inks were prepared according to the formulations in Table 1. Ink viscosity was recorded on a Brookfield DVII viscometer at 50° C.

TABLE 1

Formulations of Cyan Inks and viscosities.

| Material | Source and commercial code | Formulation |||||||||||||
| --- | --- | --- | --- | --- | --- | --- | --- | --- | --- | --- | --- | --- | --- |
| | | A | B | C | D | E | F | G | H | I | J | K | M |
| Isobornyl acrylate | Sartomer, SR506D | 30.0 | — | — | — | — | — | — | — | — | — | — | — |
| t.butyl cyclohexyl acrylate | Sartomer, SR217 | — | 30.0 | — | — | — | — | — | — | — | — | — | — |
| 3,3,5-trimethyl cyclohexyl acrylate | Sartomer, SR420 | — | — | 30.0 | — | — | — | — | — | — | — | — | — |
| 2-phenoxy ethyl acrylate | Sartomer, SR339EU | 8.125 | 8.125 | 8.125 | 38.125 | 8.125 | 8.125 | 8.125 | 8.125 | 8.125 | 8.125 | 8.125 | 8.125 |
| Cyclic Trimethylol propane formal acrylate | Sartomer, SR531 | 8.125 | 8.125 | 8.125 | 8.125 | 38.125 | 8.125 | 8.125 | 8.125 | 8.125 | 8.125 | 8.125 | 8.125 |
| o-phenyl phenoxyethyl acrylate | Miramer M1142 | — | — | — | — | — | 30.00 | — | — | — | — | — | — |
| N-vinyl caprolactam | BASF, V-CAP | 24.9 | 24.9 | 24.9 | 24.9 | 24.9 | 24.9 | 24.9 | 24.9 | 24.9 | 24.9 | 24.9 | 24.9 |
| Synthesis Example 2 | — | — | — | — | — | — | — | 30.0 | — | — | — | — | — |
| Synthesis Example 4 | — | — | — | — | — | — | — | — | 30.0 | — | — | — | — |
| Synthesis Example 6 | — | — | — | — | — | — | — | — | — | 30.0 | — | — | — |

TABLE 1-continued

Formulations of Cyan Inks and viscosities.

| Material | Source and commercial code | Formulation | | | | | | | | | | | |
|---|---|---|---|---|---|---|---|---|---|---|---|---|---|
| | | A | B | C | D | E | F | G | H | I | J | K | M |
| Synthesis Example 8 | — | — | — | — | — | — | — | — | — | — | 30.0 | — | — |
| Synthesis Example 9 | — | — | — | — | — | — | — | — | — | — | — | 30.0 | — |
| Synthesis Example 13 | — | — | — | — | — | — | — | — | — | — | — | — | 30.0 |
| Photoinitiator | IGM, Omnirad TPO | 4.9 | 4.9 | 4.9 | 4.9 | 4.9 | 4.9 | 4.9 | 4.9 | 4.9 | 4.9 | 4.9 | 4.9 |
| Photoinitiator | Lambson, Speedcure DETX | 2.0 | 2.0 | 2.0 | 2.0 | 2.0 | 2.0 | 2.0 | 2.0 | 2.0 | 2.0 | 2.0 | 2.0 |
| Photoinitiator | BASF, Irgacure 819 | 2.6 | 2.6 | 2.6 | 2.6 | 2.6 | 2.6 | 2.6 | 2.6 | 2.6 | 2.6 | 2.6 | 2.6 |
| Photoinitiator | IGM, Omnirad 481 | 2.0 | 2.0 | 2.0 | 2.0 | 2.0 | 2.0 | 2.0 | 2.0 | 2.0 | 2.0 | 2.0 | 2.0 |
| Slip additive | Evonik, Tegoglide 410 | 0.5 | 0.5 | 0.5 | 0.5 | 0.5 | 0.5 | 0.5 | 0.5 | 0.5 | 0.5 | 0.5 | 0.5 |
| Resin solution | Lucite, Elvacite 2013 | 6.0 | 6.0 | 6.0 | 6.0 | 6.0 | 6.0 | 6.0 | 6.0 | 6.0 | 6.0 | 6.0 | 6.0 |
| Stabilizer blend | — | 1.12 | 1.12 | 1.12 | 1.12 | 1.12 | 1.12 | 1.12 | 1.12 | 1.12 | 1.12 | 1.12 | 1.12 |
| Cyan pigment concentrate containing SPECTRAPAC ® C Blue 15:4 | — | 9.73 | 9.73 | 9.73 | 9.73 | 9.73 | 9.73 | 9.73 | 9.73 | 9.73 | 9.73 | 9.73 | 9.73 |
| Ink viscosity (cps at 50° C.) | — | 8.55 | 8.88 | 6.66 | 8.94 | 10.2 | 14.9 | 17.0 | 15.4 | 25.9 | 13.6 | 74.7 | 15.7 |

Adhesion

The inks in Table 1 were printed onto Dibond, polycarbonate, acrylic and flexible vinyl substrates using a number 2 K bar and cured at a dose of 150 mJ under a medium pressure mercury arc lamp on a Primarc Maxicure UV rig. Their adhesion to the test substrates was then tested with the well-known cross hatch adhesion test using a scalpel and ISO 2409 adhesive tape from Elcometer. Results are given in numerical categories according to the amount of ink removed from zero (perfect, no ink removed) to 6 (all the ink removed, no adhesion). These results are given in table 2.

TABLE 2

Adhesion results of Cyan inkjet inks.

| Formulation | Crosshatch adhesion test results | | | |
|---|---|---|---|---|
| | Dibond | Polycarbonate | Acrylic | Flexible vinyl |
| A | 0 | 0 | 0 | 1 |
| B | 0 | 0 | 0 | 1 |
| C | 0 | 0 | 0 | 1 |
| D | 0 | 0 | 0 | 1 |
| E | 0 | 0 | 0 | 0 |
| F | 0 | 0 | 0 | 1 |
| G | 0 | 0 | 0 | 1 |
| H | 0 | 0 | 0 | 2 |
| I | 0 | 0 | 0 | 3 |
| J | 0 | 0 | 0 | 1 |
| K | 0 | 0 | 0 | 2 |
| M | 0 | 0 | 0 | 0 |

The results in Table 2 demonstrate that the inventive materials can be used in ink-jet formulations without any significant loss of adhesion.

Cure Speed/blocking Resistance

The inks in Table 1 were printed onto PE85 white Top Trans label substrate (ex Avery Dennison) using a number 2 K bar and cured at a dose of 56 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of colour transferred to the blank substrate using a Spectraflash 600 Spectrophotometer measuring the DL* value through a wide aperture. Lower levels of DL* indicate better blocking performance due to lower ink transfer. Results are given in Table 3.

TABLE 3

Cure speed/blocking resistance results of Cyan inkjet inks.

| Formulation number | DL* |
|---|---|
| A | 2.10 |
| B | 2.37 |
| C | 3.36 |
| D | 1.17 |
| E | 1.11 |
| F | 0.56 |
| G | 0.46 |
| H | 0.67 |

TABLE 3-continued

Cure speed/blocking resistance results of Cyan inkjet inks.

| Formulation number | DL* |
|---|---|
| I | 0.56 |
| J | 0.90 |
| K | 0.57 |
| M | 0.06 |

The results in Table 3 demonstrate that the inventive materials show significantly better cure than all standard inkjet monomers.

Solvent Resistance

The inks in Table 1 were printed onto Lenetta charts using a number 2 K bar and cured at a dose of 150 mJ under a medium pressure mercury arc lamp on a Primarc Maxicure UV rig. The prints were then tested for their solvent (isopropyl alcohol, IPA) resistance using a Satra STM 421 rub tester. Test results are reported in Table 4 as an average of 2 results, with higher values being indicative of higher solvent resistance.

TABLE 4

Solvent resistance results of Cyan inkjet inks.

| Formulation number | IPA solvent rubs |
|---|---|
| A | 10 |
| B | 4 |
| C | 6 |
| D | 44 |
| E | 42 |
| F | 80 |
| G | 76 |
| H | 50 |
| I | 42 |
| J | 46 |
| K | 46 |
| M | 117 |

The results in Table 4 demonstrate that the inventive materials used in ink jet formulations gave similar or better solvent resistance properties compared to the commonly used inkjet monomers.

Pendulum Hardness

The inks in Table 1 were printed onto the QD-56 steel panels (ex Q-lab) using a number 2 K bar and cured at a dose of 150 mJ under a medium pressure mercury arc lamp on a Primarc Maxicure UV rig. The prints were then tested for their surface hardness using the well known Sheen pendulum hardness tester. Test results are reported in Table 5 as an average of 6 results, with higher values being indicative of higher surface hardness.

TABLE 5

Pendulum hardness results of Cyan inkjet inks.

| Formulation number | Pendulum hardness |
|---|---|
| A | 32 |
| B | 77 |
| C | 93 |
| D | 54 |

TABLE 5-continued

Pendulum hardness results of Cyan inkjet inks.

| Formulation number | Pendulum hardness |
|---|---|
| E | 71 |
| F | 112 |
| G | 97 |
| H | 80 |
| I | 83 |
| J | 52 |
| K | 103 |
| M | 67 |

The results in Table 5 demonstrate that the inventive materials used in ink-jet formulations gave similar or better pendulum hardness properties compared to commonly used inkjet monomers.

Example 15

Determination of Glass Transition Temperatures of Monomer Mixtures

Glass transition temperatures (Tg) of acrylic homopolymers are available from a number of sources including acrylate monomer suppliers such as Sartomer. These are usually determined by differential scanning calorimetry (DSC), but this is known to be relatively insensitive, particularly to cross linked systems. This example determines the glass transition temperatures of monomer mixtures using dynamic mechanical thermal analysis (DMTA) which is inherently much more sensitive.

In order to adequately measure the samples by this technique it is also necessary to prevent the sample dimensions changing too much during measurement, which would occur once a monofunctional acrylate approaches its glass transition temperature. To prevent this, blends of monofunctional monomer and low levels of the difunctional monomer hexandiol diacrylate (HDDA) are used which provides some crosslinking, and enables the structural dimensions to be preserved throughout the test.

Formulations are prepared which contain:

78% monofunctional monomer

20% HDDA

2% Lucirin TPOL (photoinitiator ex BASF)

These are drawn up into glass melting point tubes and subjected to a cure dose of 1000 mJ under a medium pressure mercury arc lamp fitted to a Primarc Maxicure UV curing rig. The sample is removed from the glass tube and analyzed by a Perkin Elmer DMA 7 operating in temperature scan mode at a frequency of 1 Hertz. The glass transition temperature of the monomer blend is recorded as the peak of the Tan Delta signal. The experimental results are recorded in Table 6 along with reference homopolymer values which are available from Sartomer product data information.

TABLE 6

Glass transition temperature data.

| Monofunctional acrylate | Source/commercial code | Experimental Tg values of blends/° C. | Reference Tg values of homopolymer/° C. |
|---|---|---|---|
| Isobornyl acrylate (IBOA) | Sartomer SR506D | 121 | 94 |
| t.butyl cyclohexyl acrylate (TBCHA) | Sartomer SR217 | 95 | 38 |
| 3,3,5-trimethyl cyclohexyl acrylate (TMCHA) | Sartomer SR420 | 70 | 27 |
| 2-phenoxyethyl acrylate (PEA) | Sartomer SR339EU | 28 | 6 |
| Cyclic trimethylolpropane formal acrylate (CTFA) | Sartomer SR531 | 55 | 9 |
| o-phenyl phenoxyethyl acrylate (PPEA) | Eternal EM2105 | 54 | — |
| Octyl/decyl acrylate (ODA) | Cytec, ODA | −27 | — |

When these results are viewed alongside the available homopolymer Tg values, the o-phenyl phenoxyethyl acrylate would appear to have a Tg somewhere in the same region as cyclic trimethylolpropane formal acrylate, but certainly not as elevated as isobornyl acrylate or t.butyl cyclohexyl acrylate.

Example 16

Properties of Monofunctional Type Ink-jet Inks Containing o-phenyl phenoxyethyl acrylate Magenta inkjet inks were prepared according to the formulations in Table 7. Ink viscosity was recorded using a Brookfield DVII viscometer at 50° C.

Blocking Resistance

The inks in Table 7 were printed onto the plastic substrate YUPO FPU250 using a number 2 K bar and cured at a dose of 150 mJ under a medium pressure mercury arc lamp on a Primarc Maxicure UV rig. The prints were then stacked with a piece of blank substrate on top and put in a Specac blocking tester between 10 cm×15 cm steel plates, and a pressure of 10 tons applied for 30 minutes. The upper substrate layer was removed for each of the prints and the level of ink blocking determined by the average amount of color transferred to the blank substrate using a Spectraflash 600 Spectrophotometer measuring the DL* value through a wide aperture at 9 places across the surface. Lower levels of DL* indicate better blocking performance due to lower ink transfer. Results are given in Table 8.

TABLE 7

Formulations of Magenta inkjet inks and viscosity data.

| Material | Source/commercial code | Formulation | | | | | |
|---|---|---|---|---|---|---|---|
| | | 2A | 2B | 2C | 2D | 2E | 2F |
| Isobornyl acrylate | Sartomer, SR506D | 42.9 | | | | | |
| t.butyl cyclohexyl acrylate | Sartomer, SR217 | | 42.9 | | | | |
| 3,3,5-trimethyl cyclohexyl acrylate | Sartomer, SR420 | | | 42.9 | | | |
| 2-phenoxyethyl acrylate | Sartomer, SR339EU | | | | 42.9 | | |
| Cyclic trimethylolpropane formal acrylate | Sartomer, SR531 | | | | | 42.9 | |
| o-phenyl phenoxyethyl acrylate | Eternal, EM2105 | | | | | | 42.9 |
| N-vinyl caprolactam | BASF, V-CAP | 24.9 | 24.9 | 24.9 | 24.9 | 24.9 | 24.9 |
| Photoinitiator | IGM, Omnirad TPO | 4.9 | 4.9 | 4.9 | 4.9 | 4.9 | 4.9 |
| Photoinitiator | Lambson, Speedcure DETX | 2 | 2 | 2 | 2 | 2 | 2 |
| Photoinitiator | BASF, Irgacure 819 | 2.6 | 2.6 | 2.6 | 2.6 | 2.6 | 2.6 |
| Photoinitiator | IGM, Omnirad 481 | 2 | 2 | 2 | 2 | 2 | 2 |
| Slip additive | Evonik, Tegoglide 410 | 0.5 | 0.5 | 0.5 | 0.5 | 0.5 | 0.5 |
| Resin solution in 2-phenoxyethyl acrylate | Lucite, Elvacite 2013 | 4 | 4 | 4 | 4 | 4 | 4 |
| Stabilizer blend | Phenolic-type | 1.2 | 1.2 | 1.2 | 1.2 | 1.2 | 1.2 |
| Magenta pigment concentrate containing 21% of CI Pigment Violet 19 in 2-phenoxyethyl acrylate | | 15 | 15 | 15 | 15 | 15 | 15 |
| Total | | 100.0 | 100.0 | 100.0 | 100.0 | 100.0 | 100.0 |
| Ink viscosity (cps at 50° C.) | | 8.22 | 8.37 | 5.88 | 8.76 | 10.6 | 17.6 |

Note:
All ink examples are blended under high-speed mixer until homogenous

TABLE 8

Block resistance results of Magenta inkjet inks.

| Formulation | DL* |
|---|---|
| 2A | 0.62 |
| 2B | 1.4 |
| 2C | 5.4 |
| 2D | 2.35 |
| 2E | 2.24 |
| 2F | 0.49 |

The results in Table 8 demonstrate that the formulation 2F, containing the preferred inventive material o-phenyl phenoxyethyl acrylate has the best anti-blocking characteristics and is superior even to isobornyl acrylate.

Adhesion

The inks in Table 7 were printed onto Dibond, polycarbonate, acrylic and flexible vinyl substrates using a number 2 K bar and cured at a dose of 150 mJ under a medium pressure mercury arc lamp on a Primarc Maxicure UV rig. Their adhesion to the test substrates was then tested with the well known cross hatch adhesion test using a scalpel and ISO 2409 adhesive tape from Elcometer. Results are given in numerical categories according to the amount of ink removed from zero (perfect, no ink removed) to 6 (all the ink removed, no adhesion). These results are given in Table 9.

TABLE 9

Adhesion results of Magenta inkjet inks.

| | Crosshatch adhesion test results | | | |
|---|---|---|---|---|
| Formulation | Dibond | Polycarbonate | Acrylic | Flexible vinyl |
| 2A | 0 | 0 | 0 | 1 |
| 2B | 0 | 0 | 0 | 1 |
| 2C | 0 | 0 | 0 | 1 |
| 2D | 5 | 0 | 0 | 1 |
| 2E | 5 | 0 | 0 | 1 |
| 2F | 1 | 0 | 1 | 1 |

The results in Table 4 demonstrate that the preferred inventive material o-phenyl phenoxyethyl acrylate (2F) can be used in ink-jet formulations without any significant loss of adhesion, and offers a marked improvement in adhesion over the widely used 2-phenoxyethyl acrylate and cyclic trimethylolpropane formal acrylate.

Example 17

Properties of White High Adhesion Type Ink-jet Inks Containing o-phenyl phenoxyethyl acrylate White inkjet inks were prepared according to the formulations in Table 10. Ink viscosity was recorded using a Brookfield DVII viscometer at 50° C.

TABLE 10

Formulations of White inkjet inks and viscosity data.

| | | Formulation | | | | | |
|---|---|---|---|---|---|---|---|
| Material | Source/commercial code | 3A | 3B | 3C | 3D | 3E | 3F |
| Isobornyl acrylate | Sartomer, SR506D | 36.78 | | | | | |
| t.butyl cyclohexyl acrylate | Sartomer, SR217 | | 36.78 | | | | |
| 3,3,5-trimethyl cyclohexyl acrylate | Sartomer, SR420 | | | 36.78 | | | |
| 2-phenoxyethyl acrylate | Sartomer, SR339EU | | | | 36.78 | | |
| Cyclic trimethylolpropane formal acrylate | Sartomer, SR531 | | | | | 36.78 | |
| o-phenyl phenoxyethyl acrylate | Eternal, EM2105 | | | | | | 36.78 |
| N-vinyl caprolactam | BASF, V-CAP | 21 | 21 | 21 | 21 | 21 | 21 |
| Photoinitiator | IGM, Omnirad TPO | 2.5 | 2.5 | 2.5 | 2.5 | 2.5 | 2.5 |
| Photoinitiator | IGM, Omnirad 481 | 5 | 5 | 5 | 5 | 5 | 5 |
| Slip additive | Evonik, Tegoglide 410 | 0.31 | 0.31 | 0.31 | 0.31 | 0.31 | 0.31 |
| Resin solution (in 2-phenoxyethyl acrylate) | Lucite, Elvacite 2013 | 16.5 | 16.5 | 16.5 | 16.5 | 16.5 | 16.5 |
| Stabilizer blend | Phenolic-type | 0.23 | 0.23 | 0.23 | 0.23 | 0.23 | 0.23 |
| Dispersant solution (EFKA 7411 in 2-phenoxyethyl acrylate) | | 3.03 | 3.03 | 3.03 | 3.03 | 3.03 | 3.03 |
| Titanium dioxide pigment | Sachtleben, RDI-S | 14.65 | 14.65 | 14.65 | 14.65 | 14.65 | 14.65 |
| Total | | 100.0 | 100.0 | 100.0 | 100.0 | 100.0 | 100.0 |
| Ink viscosity (cps at 50° C.) | | 10.8 | 10.8 | 7.41 | 11.2 | 13.0 | 21.8 |

Pendulum Hardness

The inks in Table 10 were printed onto QD-56 steel panels (ex Q-lab) using a number 2 K bar and cured at a dose of 293 mJ under a medium pressure mercury arc lamp on a Primarc Maxicure UV rig. The prints were then tested for their surface hardness using the well known Sheen pendulum hardness tester. Test results are reported in Table 11 as an average of 6 results, with higher values being indicative of higher surface hardness.

TABLE 11

Pendulum hardness results of White inkjet inks.

| Formulation | Pendulum hardness |
|---|---|
| 3B | 46.8 |
| 3C | 53.5 |
| 3D | 59.7 |
| 3E | 83.7 |
| 3F | 123.8 |

The results in Table 11 demonstrate that the formulation 3F, containing the preferred inventive material o-phenyl phenoxyethyl acrylate has the highest surface hardness characteristics and is superior even to isobornyl acrylate.

Cure Speed

The inks in Table 10 were printed onto Lenetta charts using a number 2 K bar and cured at a range of UV doses dose under a medium pressure mercury arc lamp on a Primarc Maxicure UV rig to determine the minimum cure dose. This was assessed by the well known thumb twist and surface finger tack tests. Test results are reported in Table 12 with lower values being indicative of superior cure and surface hardness properties.

TABLE 12

Cure speed results of Whie inkjet inks.

| Formulation | Minimum Cure dose (mJ) |
|---|---|
| 3A | 197 |
| 3B | 197 |
| 3C | 293 |
| 3D | 119 |
| 3E | 148 |
| 3F | <35 |

The results in Table 12 demonstrate that the formulation 3F, containing the preferred inventive material o-phenyl phenoxyethyl acrylate has the fastest cure speed and is superior to all the other commonly used inkjet monomers.

Adhesion

The inks in Table 10 were printed onto Dibond, polycarbonate, acrylic and flexible vinyl substrates using a number 2 K bar and cured at a dose of 293 mJ under a medium pressure mercury arc lamp on a Primarc Maxicure UV rig. Their adhesion to the test substrates was then tested with the well known cross hatch adhesion test using a scalpel and ISO 2409 adhesive tape from Elcometer. Results are given in numerical categories according to the amount of ink removed from zero (perfect, no ink removed) to 6 (all the ink removed, no adhesion). These results are given in Table 13.

TABLE 13

Adhesion results of White inkjet inks.

| Formulation | Crosshatch adhesion test results | | | |
|---|---|---|---|---|
| | Dibond | Polycarbonate | Acrylic | Flexible vinyl |
| 3A | 0 | 0 | 0 | 0 |
| 3B | 0 | 0 | 0 | 0 |
| 3C | 0 | 0 | 0 | 0 |
| 3D | 0 | 0 | 0 | 0 |
| 3E | 0 | 0 | 0 | 0 |
| 3F | 0 | 0 | 0 | 0 |

The results in Table 13 demonstrate that the preferred inventive material o-phenyl phenoxyethyl acrylate (3F) can be used in white ink-jet formulations without any loss of adhesion.

Example 18

Properties of Multifunctional Type Ink-jet Inks Containing o-phenyl phenoxyethyl acrylate Cyan inkjet inks were prepared according to the formulations in Table 14. Ink viscosity was recorded using a Brookfield DVII viscometer at 50° C.

TABLE 14

Formulations of multifunctional Cyan inkjet inks and viscosity data.

| Material | Source/commercial code | Formulation | | | | | |
|---|---|---|---|---|---|---|---|
| | | 4A | 4B | 4C | 4D | 4E | 4F |
| Isobornyl acrylate | Sartomer, SR506D | 16 | | | | | |
| t.butyl cyclohexyl acrylate | Sartomer, SR217 | | 16 | | | | |
| 3,3,5-trimethyl cyclohexyl acrylate | Sartomer, SR420 | | | 16 | | | |
| 2-phenoxyethyl acrylate | Sartomer, SR339EU | | | | 16 | | |
| Cyclic trimethylolpropane formal acrylate | Sartomer, SR531 | | | | | 16 | |
| o-phenyl phenoxyethyl acrylate | Eternal, EM2105 | | | | | | 16 |
| Hexandiol diacrylate | Sartomer, SR238 | 30.87 | 30.87 | 30.87 | 30.87 | 30.87 | 30.87 |
| Dipropylene glycol diacrylate | Sartomer, SR508 | 13.93 | 13.93 | 13.93 | 13.93 | 13.93 | 13.93 |
| Photoinitiator | IGM, Omnirad TPO | 4.9 | 4.9 | 4.9 | 4.9 | 4.9 | 4.9 |
| Photoinitiator | BASF, Irgacure 369 | 0.5 | 0.5 | 0.5 | 0.5 | 0.5 | 0.5 |
| Photoinitiator | IGM, Omnirad 4PBZ | 2 | 2 | 2 | 2 | 2 | 2 |
| Photoinitiator | Lambson, DETX | 4 | 4 | 4 | 4 | 4 | 4 |
| Photoinitiator | BASF, Irgacure 819 | 1.4 | 1.4 | 1.4 | 1.4 | 1.4 | 1.4 |
| Amine synergist | Sartomer, CN3715 | 5 | 5 | 5 | 5 | 5 | 5 |
| Slip additive | Evonik, Tegoglide 410 | 0.5 | 0.5 | 0.5 | 0.5 | 0.5 | 0.5 |
| Resin solution (in 2-phenoxyethyl acrylate) | Lucite, Elvacite 2013 | 5 | 5 | 5 | 5 | 5 | 5 |
| Stabilizer blend | Phenolic-type | 1.1 | 1.1 | 1.1 | 1.1 | 1.1 | 1.1 |
| Pigment concentrate containing 30% CI Pigment Blue 15:4 in 2-phenoxyethl acrylate | | 14.8 | 14.8 | 14.8 | 14.8 | 14.8 | 14.8 |
| Total | | 100.0 | 100.0 | 100.0 | 100.0 | 100.0 | 100.0 |
| Ink viscosity (cps at 50° C.) | | 10.3 | 9.72 | 10 | 10 | 10.7 | 12.8 |

Solvent Resistance

The inks in Table 14 were printed onto Lenetta charts using a number 2 K bar and cured at a dose of 150 mJ under a medium pressure mercury arc lamp on a Primarc Maxicure UV rig. The prints were then tested for their solvent (methyl ethyl ketone, MEK) resistance using a Satra STM 421 rub tester. Test results are reported in Table 15 as an average of 2 results, with higher values being indicative of higher solvent resistance.

TABLE 15

Solvent resistence data for multifunctional Cyan inkjet inks.

| Formulation | MEK Solvent rubs* |
|---|---|
| 4A | 105 |
| 4B | 122 |
| 4C | 117 |
| 4D | 114 |
| 4E | 115 |
| 4F | 177 |

*Number of rubs required to cause failure of the ink film all the way down to the substrate using a solvent soaked pad.

The results in Table 15 demonstrate that the formulation 4F, containing the preferred inventive material o-phenyl phenoxyethyl acrylate has by far the highest MEK surface solvent resistance compared to all the inkjet monomers tested and is capable of providing a significant improvement in Solvent resistance to a multifunctional ink system. Those skilled in the art would normally be expected to have solvent resistance properties dominated by the multifunctional monomers.

Cure Speed/blocking Resistance

The inks in Table 14 were printed onto PE85 white Top Trans label substrate (ex Avery Dennison) using a number 2 K bar and cured at a dose of 50 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate better blocking performance due to lower ink transfer. Results are given in Table 16.

TABLE 16

Cure speed/blocking resistance results for multifunctional Cyan inkjet inks.

| Formulation | DL* |
|---|---|
| 4A | 2.68 |
| 4B | 3.13 |
| 4C | 3.15 |
| 4D | 0.81 |
| 4E | 1.02 |
| 4F | 0.19 |

The results in Table 16 demonstrate that the formulation 4F, containing the preferred inventive material o-phenyl phenoxyethyl acrylate has the best anti-blocking and faster cure characteristics compared to all the inkjet monomers tested and has considerable utility even at relatively low levels in an ink based on fast curing multifunctional monomers.

Example 19

Properties of Monofunctional Type Ink-jet Inks Containing o-phenyl phenoxyethyl acrylate Cyan inkjet inks were prepared according to the formulations in Tables 17 & 18, where formulations 5A-F in Table 17 contains increasing levels of o-phenyl phenoxyethyl acrylate. A second similar set of formulations are given in Table 18, were prepared which contain the higher Tg monomer 3,3,5-trimethyl cyclohexyl acrylate (SR420 ex Sartomer) in place of o-phenyl phenoxyethyl acrylate at equivalent levels. These are denoted as formulations 5G-L. Ink viscosity was recorded using a Brookfield DVII viscometer at 50° C.

TABLE 17

Formulations of Cyan inkjet inks with various levels of o-phenyl phenoxyethyl acrylate and viscosity data.

| | | Formulation | | | | | | |
|---|---|---|---|---|---|---|---|---|
| Material | Source/commercial code | Std | 5A | 5B | 5C | 5D | 5E | 5F |
| o-phenyl phenoxyethyl acrylate | Eternal, EM2105 | | 5 | 15 | 25 | 35 | 45 | 55 |
| 2-phenoxyethyl acrylate | Sartomer, SR339EU | 23.25 | 18.25 | 8.25 | | | | |
| Cyclic trimethylolpropane formal acrylate | Sartomer, SR531 | 18 | 18 | 18 | 16.25 | 6.25 | | |
| Isobornyl acrylate | Sartomer, SR506D | 12 | 12 | 12 | 12 | 12 | 8.25 | |
| N-vinyl caprolactam | BASF, V-CAP | 24.9 | 24.9 | 24.9 | 24.9 | 24.9 | 24.9 | 23.15 |
| Photoinitiator | IGM, Omnirad TPO | 4.9 | 4.9 | 4.9 | 4.9 | 4.9 | 4.9 | 4.9 |
| Photoinitiator | Lambson, Speedcure DETX | 2 | 2 | 2 | 2 | 2 | 2 | 2 |
| Photoinitiator | IGM, Omnirad 808 | 2.6 | 2.6 | 2.6 | 2.6 | 2.6 | 2.6 | 2.6 |
| Photoinitiator | IGM, Omnirad 481 | 2 | 2 | 2 | 2 | 2 | 2 | 2 |
| Slip additive | Evonik, Tegoglide 410 | 0.5 | 0.5 | 0.5 | 0.5 | 0.5 | 0.5 | 0.5 |
| Stabilizer blend | Phenolic-type | 0.12 | 0.12 | 0.12 | 0.12 | 0.12 | 0.12 | 0.12 |
| Cyan pigment concentrate containing 25% of CI Pigment Blue 15:4 in cyclic trimethylolpropane formal acrylate | | 9.73 | 9.73 | 9.73 | 9.73 | 9.73 | 9.73 | 9.73 |
| Total | | 100.0 | 100.0 | 100.0 | 100.0 | 100.0 | 100.0 | 100.0 |
| Ink viscosity (cps at 50° C.) | | 6.81 | 7.29 | 8.43 | 10.0 | 10.6 | 13.5 | 16.0 |

TABLE 18

Formulations of Cyan inkjet inks with various levels of the monomer
3,3,5-trimethyl cyclohexyl acrylate and viscosity data of such formulations.

| Material | Source/commercial code | Formulation | | | | | | |
|---|---|---|---|---|---|---|---|---|
| | | Std | 5G | 5H | 5I | 5J | 5K | 5L |
| 3,3,5-trimethyl cyclohexyl acrylate | Sartomer, SR420 | | 5 | 15 | 25 | 35 | 45 | 55 |
| 2-phenoxyethyl acrylate | Sartomer, SR339EU | 23.25 | 18.25 | 8.25 | | | | |
| Cyclic trimethylolpropane formal acrylate | Sartomer, SR531 | 18 | 18 | 18 | 16.25 | 6.25 | | |
| Isobornyl acrylate | Sartomer, SR506D | 12 | 12 | 12 | 12 | 12 | 8.25 | |
| N-vinyl caprolactam | BASF, V-CAP | 24.9 | 24.9 | 24.9 | 24.9 | 24.9 | 24.9 | 23.15 |
| Photoinitiator | IGM, Omnirad TPO | 4.9 | 4.9 | 4.9 | 4.9 | 4.9 | 4.9 | 4.9 |
| Photoinitiator | Lambson, Speedcure DETX | 2 | 2 | 2 | 2 | 2 | 2 | 2 |
| Photoinitiator | IGM, Omnirad 808 | 2.6 | 2.6 | 2.6 | 2.6 | 2.6 | 2.6 | 2.6 |
| Photoinitiator | IGM, Omnirad 481 | 2 | 2 | 2 | 2 | 2 | 2 | 2 |
| Slip additive | Evonik, Tegoglide 410 | 0.5 | 0.5 | 0.5 | 0.5 | 0.5 | 0.5 | 0.5 |
| Stabilizer blend | Phenolic-type | 0.12 | 0.12 | 0.12 | 0.12 | 0.12 | 0.12 | 0.12 |
| Cyan pigment concentrate containing 25% of CI Pigment Blue 15:4 in cyclic trimethylolpropane formal acrylate | | 9.73 | 9.73 | 9.73 | 9.73 | 9.73 | 9.73 | 9.73 |
| Total | | 100.0 | 100.0 | 100.0 | 100.0 | 100.0 | 100.0 | 100.0 |
| Ink viscosity (cps at 50° C.) | | 6.81 | 6.54 | 6.0 | 5.67 | 5.01 | 4.53 | 4.35 |

Adhesion

The inks in Tables 17 & 18 were printed onto Dibond, polycarbonate, acrylic, rigid polystyrene, rigid vinyl and flexible vinyl substrates using a 8 micron K bar and cured at a dose of 150 mJ under a medium pressure mercury arc lamp on a Fusion Microwave UV rig. Their adhesion to the test substrates was then tested with the well known cross hatch adhesion test using a scalpel and ISO 2409 adhesive tape from Elcometer. Results are given in numerical categories according to the amount of ink removed from zero (perfect, no ink removed) to 6 (all the ink removed, no adhesion). These results are given in Table 19.

TABLE 19

Adhesion results of Cyan inkjet inks with various levels of o-phenyl phenoxyethyl acrylate.

| | Crosshatch adhesion test results | | | | | |
|---|---|---|---|---|---|---|
| Formuation | Dibond | Polycarbonate | Acrylic | Rigid Polystyrene | Rigid PVC | Flexible vinyl |
| Std | 1-3 | 0 | 1 | NA | NA | 0 |
| 5A | 1 | 0 | 1 | 1 | 1 | 0 |
| 5B | 1 | 0 | 1 | 1 | 1 | 0 |
| 5C | 1 | 0 | 1 | 1-2 | 0 | 0 |
| 5D | 1 | 0 | 1 | 2 | 1 | 0 |
| 5E | 1 | 0 | 1 | 1-2 | 1-2 | 1 |
| 5F | 1 | 0 | 1 | 1-3 | 1-3 | 2-3 |
| 5G | 1 | 0 | 1 | 0 | 0 | 0 |
| 5H | 1 | 0 | 1 | 0-2 | 0 | 0 |
| 5I | 1 | 0 | 1 | 0-1 | 0 | 0 |
| 5J | 1 | 0 | 1 | 0-1 | 0 | 0 |
| 5K | 1 | 0 | 1 | 0 | 0 | 0 |
| 5L | 1 | 0 | 1 | 0 | 0 | 0 |

The results in Table 19 demonstrate that the preferred inventive material o-phenyl phenoxyethyl acrylate can be used in ink-jet formulations at concentrations up to around 50% without any significant loss of adhesion against a typical standard commercial formulation. Equivalent formulations based on the high Tg monomer 3,3,5-trimethyl cyclohexyl acrylate also show good adhesion.

Cure Speed/blocking Resistance

The inks 5A-L in Tables 17 & 18 were printed onto PE85 white Top Trans label substrate (ex Avery Dennison) using a number 2 K bar and cured at a dose of 50 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate better blocking performance due to lower ink transfer. Results are given in Table 20.

TABLE 20

Cure speed/blocking resistance results of Cyan inkjet inks with various levels of o-phenyl phenoxyethyl acrylate or 3,3,5-trimethyl cyclohexyl acrylate.

| Formulation number | % Test Monomer | DL* |
|---|---|---|
| Std | 0 | 1.0 |
| 5A | 5 | 0.38 |
| 5B | 15 | 0.09 |
| 5C | 25 | 0.02 |
| 5D | 35 | 0.14 |
| 5E | 45 | 0.17 |
| 5F | 55 | 0.12 |
| 5G | 5 | 0.77 |

TABLE 20-continued

Cure speed/blocking resistance results of Cyan inkjet inks with various levels of o-phenyl phenoxyethyl acrylate or 3,3,5-trimethyl cyclohexyl acrylate.

| Formulation number | % Test Monomer | DL* |
|---|---|---|
| 5H | 15 | 1.75 |
| 5I | 25 | 4.46 |
| 5J | 35 | 6.25 |
| 5K | 45 | 8.48 |
| 5L | 55 | 10.45 |

The results in Table 20 demonstrate that the formulations (5A-F) containing the preferred inventive material o-phenyl phenoxyethyl acrylate (PPEA) have significantly improved cure speed and blocking resistance compared to both the reference standard and equivalent formulations (5G-L) containing the higher Tg monomer 3,3,5-trimethyl cyclohexyl acrylate, demonstrating excellent utility.

Solvent Resistance

The inks 5A-L in Tables 17 & 18 were printed onto Lenetta charts using a number 2 K bar and cured at a dose of 150 mJ under a medium pressure mercury arc lamp on a Primarc Maxicure UV rig. The prints were then tested for their solvent (isopropyl alcohol, IPA) resistance using the Satra STM 421 rub tester. Test results are reported in Table 21 as an average of 2 results, with higher values being indicative of higher solvent hardness.

TABLE 21

Solvent resistance results of Cyan inkjet inks with various levels of o-phenyl phenoxyethyl acrylate or 3,3,5-trimethyl cyclohexyl acrylate.

| Formulation number | % Test Monomer | IPA solvent rubs |
|---|---|---|
| Std | 0 | 27 |
| 5A | 5 | 35 |
| 5B | 15 | 49 |
| 5C | 25 | 58 |
| 5D | 35 | 85 |
| 5E | 45 | 84 |
| 5F | 55 | 155.5 |
| 5G | 5 | 22 |
| 5H | 15 | 11 |
| 5I | 25 | 6 |
| 5J | 35 | 4 |
| 5K | 45 | 4 |
| 5L | 55 | 4 |

The results in Table 21 demonstrate that the formulations (5A-F) containing the inventive material o-phenyl phenoxyethyl acrylate (PPEA) have significantly improved solvent resistance compared to both the reference standard and equivalent formulations (5G-L) containing the higher Tg monomer 3,3,5-trimethyl cyclohexyl acrylate, demonstrating excellent utility.

Pendulum Hardness

The inks 5A-L in Tables 17 & 18 were printed onto QD-56 steel panels (ex Q-lab) using a number 2 K bar and cured at a dose of 150 mJ under a medium pressure mercury arc lamp on a Primarc Maxicure UV rig. The prints were then tested for their surface hardness using the well known Sheen pendulum hardness tester. Test results are reported in Table 22 as an average of 6 results, with higher values being indicative of higher surface hardness.

TABLE 22

Pendulum hardness results of Cyan inkjet inks with various levels of o-phenyl phenoxyethyl acrylate or 3,3,5-trimethyl cyclohexyl acrylate.

| Formulation number | % Test Monomer | Pendulum Hardness |
|---|---|---|
| Std | 0 | 95 |
| 5A | 5 | 145 |
| 5B | 15 | 151 |
| 5C | 25 | 155 |
| 5D | 35 | 187 |
| 5E | 45 | 180 |
| 5F | 55 | 156 |
| 5G | 5 | 137 |
| 5H | 15 | 149 |
| 5I | 25 | NA |
| 5J | 35 | NA |
| 5K | 45 | 137 |
| 5L | 55 | 139 |

The results in Table 22 demonstrate that the formulations (5A-F) containing the preferred inventive material o-phenyl phenoxyethyl acrylate (PPEA) have significantly improved Pendulum Hardness compared to both the reference standard and equivalent formulations (5G-L) containing the higher Tg monomer 3,3,5-trimethyl cyclohexyl acrylate, demonstrating excellent utility.

Flexibility

The inks 5A-L in Tables 17 & 18 were printed onto a flexible white vinyl substrate using an 8 micron K bar and cured at a dose of 150 mJ under a medium pressure mercury arc lamp on a Fusion microwave UV rig. The prints were then tested for their flexibility by bending the print through 180 degrees and creasing firmly between thumb and forefinger. Flexibility was assigned a value between 1 and 4. The results are shown in Table 23.

TABLE 23

Flexibility results of Cyan inkjet inks with various levels of o-phenyl phenoxyethyl acrylate or 3,3,5-trimethyl cyclohexyl acrylate.

| Formulation number | % Test Monomer | Flexibility* |
|---|---|---|
| Std | 0 | 0 |
| 5A | 5 | 0 |
| 5B | 15 | 1 |
| 5C | 25 | 1 |
| 5D | 35 | 1 |
| 5E | 45 | 1 |
| 5F | 55 | 1 |
| 5G | 5 | 0 |
| 5H | 15 | 1 |
| 5I | 25 | 1 |
| 5J | 35 | 1 |
| 5K | 45 | 1 |
| 5L | 55 | 1 |

*Ratings:
0 = No Cracking
1 = Slight/fine crazing
2 = Coarse cracking
3 = Flaking The results in Table 23 demonstrate that the formulations (5A-F) containing the preferred inventive material o-phenyl phenoxyethyl acrylate do not lead to significant embrittlement, and confirms that this material is capable of being used at significant levels in flexible monofunctional type inks without adverse effects. The higher Tg monomer 3,3,5-trimethyl cyclohexyl acrylate is similarly capable of being used at high levels without adverse effects on ink flexibility.

Stackability/Blocking

The inks 5A-L in Tables 17 & 18 were printed onto a flexible white vinyl substrate using an 8 micron K bar and cured at doses of 50, 100 & 150 mJ under a medium pressure mercury arc lamp on a Fusion microwave UV rig. The prints were then tested for their stackability & blocking resistance. The results are shown in Table 24.

TABLE 24

Stackability/blocking results of Cyan inkjet inks with various levels of o-phenyl phenoxyethyl acrylate or 3,3,5-trimethyl cyclohexyl acrylate.

| Formulation number | % Test Monomer | UV Cure Dose (mJ) | Stackability* |
|---|---|---|---|
| Std | 0 | 50 | FAIL |
| 5A | 5 | 50 | OK |
| 5B | 15 | 50 | OK |
| 5C | 25 | 50 | PASS |
| 5D | 35 | 50 | PASS |
| 5E | 45 | 50 | PASS |
| 5F | 55 | 50 | PASS |
| 5G | 5 | 50 | FAIL |
| 5H | 15 | 50 | FAIL |
| 5I | 25 | 50 | FAIL |
| 5J | 35 | 50 | FAIL |
| 5K | 45 | 50 | FAIL |
| 5L | 55 | 50 | FAIL |
| Std | 0 | 100 | FAIL |
| 5A | 5 | 100 | PASS |
| 5B | 15 | 100 | PASS |
| 5C | 25 | 100 | PASS |
| 5D | 35 | 100 | PASS |
| 5E | 45 | 100 | PASS |
| 5F | 55 | 100 | PASS |
| 5G | 5 | 100 | FAIL |
| 5H | 15 | 100 | FAIL |
| 5I | 25 | 100 | FAIL |
| 5J | 35 | 100 | FAIL |
| 5K | 45 | 100 | FAIL |
| 5L | 55 | 100 | FAIL |
| Std | 0 | 150 | OK |
| 5A | 5 | 150 | PASS |
| 5B | 15 | 150 | PASS |
| 5C | 25 | 150 | PASS |
| 5D | 35 | 150 | PASS |

TABLE 24-continued

Stackability/blocking results of Cyan inkjet inks with various levels of o-phenyl phenoxyethyl acrylate or 3,3,5-trimethyl cyclohexyl acrylate.

| Formulation number | % Test Monomer | UV Cure Dose (mJ) | Stackability* |
|---|---|---|---|
| 5E | 45 | 150 | PASS |
| 5F | 55 | 150 | PASS |
| 5G | 5 | 150 | PASS |
| 5H | 15 | 150 | OK |
| 5I | 25 | 150 | FAIL |
| 5J | 35 | 150 | FAIL |
| 5K | 45 | 150 | FAIL |
| 5L | 55 | 150 | FAIL |

*Ratings:
FAIL—The blank substrate sticks to the printed ink and makes a distinct audible "crackling" noise as the sheets are separated.
OK—Some slight adherence of the substrate to the printed ink, but no noise is apparent on separation of the sheets and very little effort required to separate the sheets.
PASS—There is no adherence between the substrate and the printed ink, and no noise on separation of the sheets.

The results in Table 24 demonstrate that the formulations (5A-F) containing the preferred inventive material o-phenyl phenoxyethyl acrylate lead to enhanced stackability and blocking resistance compared to the standard formulation and those (5G-L) based on the higher Tg monomer 3,3,5-trimethyl cyclohexyl acrylate. This confirms that o-phenyl phenoxyethyl acrylate is advantageously used at significant levels in flexible monofunctional type inks in order to combat the blocking tendency of thermoplastic monofunctional inks.

Example 20

Properties of Monofunctional Type Ink-jet Inks Containing o-phenyl phenoxyethyl acrylate Magenta inkjet inks were prepared according to the formulations in Table 25, where formulations contained increasing levels of o-phenyl phenoxyethyl acrylate at the expense of the material N-vinyl caprolatam. Ink viscosity was recorded using a Brookfield DVII viscometer at 50° C.

TABLE 25

Formulations of for Magenta inkjet inks containing increasing levels of o-phenyl phenoxyethyl acrylate at the expense of the material N-vinyl caprolatam.

| Material | Source/commercial code | Formulation | | | |
|---|---|---|---|---|---|
| | | Std | 6A | 6B | 6C |
| o-phenyl phenoxyethyl acrylate | Miwon, Miramer M1142 | 0 | 8 | 16 | 24.9 |
| Cyclic trimethylolpropane formal acrylate | Sartomer, SR531 | 27.76 | 27.76 | 27.76 | 27.76 |
| Isobornyl acrylate | Sartomer, SR506D | 12 | 12 | 12 | 12 |
| N-vinyl caprolactam | BASF, V-CAP | 24.9 | 16.9 | 8.9 | 0 |
| Photoinitiator | IGM, Omnirad TPO | 4.4 | 4.4 | 4.4 | 4.4 |
| Photoinitiator | Lambson, Speedcure DETX | 2 | 2 | 2 | 2 |
| Photoinitiator | BASF, Irgacure 819 | 5 | 5 | 5 | 5 |
| Photoinitiator | IGM, Omnirad 481 | 2 | 2 | 2 | 2 |
| Slip additive | Evonik, Tegoglide 410 | 0.5 | 0.5 | 0.5 | 0.5 |
| Stabilizer blend | Phenolic-type | 1.2 | 1.2 | 1.2 | 1.2 |
| Magenta pigment concentrate containing 19.3% of CI Pigment Violet 19 in 2-phenoxyethyl acrylate | | 20.24 | 20.24 | 20.24 | 20.24 |
| Total | | 100.0 | 100.0 | 100.0 | 100.0 |
| Ink viscosity (cps at 50° C.) | | 9.0 | 10.1 | 11.8 | 14.2 |

Adhesion

The inks in Table 25 were printed onto, Raynorbond, polycarbonate, acrylic, and flexible vinyl substrates using a 12 micron K bar and cured at a dose of 150 mJ under a medium pressure mercury arc lamp on a Fusion Microwave UV rig. Their adhesion to the test substrates was then tested with the well known cross hatch adhesion test using a scalpel and ISO 2409 adhesive tape from Elcometer. Results are given in numerical categories according to the amount of ink removed from zero (perfect, no ink removed) to 6 (all the ink removed, no adhesion). These results are given in Table 26.

TABLE 26

Adhesion results for Magenta inkjet inks containing increasing levels of o-phenyl phenoxyethyl acrylate at the expense of the material N-vinyl caprolatam.

| Formulation | Crosshatch adhesion test result | | | |
| --- | --- | --- | --- | --- |
| | Raynorbond | Polycarbonate | Acrylic | Flexible vinyl |
| Std | 1 | 1 | 1 | 1 |
| 6A | 3 | 0 | 1 | 0 |
| 6B | 1 | 0 | 0 | 0 |
| 6C | 2 | 0 | 0 | 0 |

These results indicate that despite the material N-vinyl caprolactam being well known to those skilled in the art to be important for achieving good adhesion properties in inkjet inks, it is possible to replace this material with the inventive material and maintain good ink adhesion.

Cure Speed/blocking Resistance

The inks in Table 25 were printed onto PE85 white Top Trans label substrate (ex Avery Dennison) using a number 2 K bar and cured at a dose of 50 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate better blocking performance due to lower ink transfer. Results are given in Table 27.

TABLE 27

Cure speed/blocking resistance results for Magenta inkjet inks containing increasing levels of o-phenyl phenoxyethyl acrylate at the expense of the material N-vinyl caprolatam.

| Formulation number | DL* |
| --- | --- |
| Std | 3.66 |
| 6A | 2.95 |
| 6B | 2.92 |
| 6C | 4.53 |

These results indicate that despite the material N-vinyl caprolactam being well known to those skilled in the art to be important for achieving cure speed in monofunctional type inkjet inks, it is possible to replace this material with the inventive material and maintain good cure speed/blocking resistance.

Solvent Resistance

The inks in Table 25 were printed onto Lenetta charts using a number 2 K bar and cured at a dose of 150 mJ under a medium pressure mercury arc lamp on a Primarc Maxicure UV rig. The prints were then tested for their solvent (iso-propyl alcohol, IPA) resistance using a Satra STM 421 rub tester. Test results are reported in Table 28 as an average of 2 results, with higher values being indicative of higher solvent hardness.

TABLE 28

Solvent resistance results for Magenta inkjet inks containing increasing levels of o-phenyl phenoxyethyl acrylate at the expense of the material N-vinyl caprolatam.

| Formulation number | IPA solvent rubs |
| --- | --- |
| Std | 25 |
| 6A | 48 |
| 6B | 104.5 |
| 6C | 181.5 |

These results indicate that despite the material N-vinyl caprolactam being well known to those skilled in the art to be important for achieving good resistance properties in monofunctional type inkjet inks, it is possible to replace this material with the inventive material and achieve a significant improvement in solvent resistance properties.

Pendulum Hardness

The inks in Table 25 were printed onto QD-56 steel panels (ex Q-lab) using a number 2 K bar and cured at a dose of 150 mJ under a medium pressure mercury arc lamp on a Primarc Maxicure UV rig. The prints were then tested for their surface hardness using the well known Sheen pendulum hardness tester. Test results are reported in Table 29 as an average of 6 results, with higher values being indicative of higher surface hardness.

TABLE 29

Pendulum hardness results for Magenta inkjet inks containing increasing levels of o-phenyl phenoxyethyl acrylate at the expense of the material N-vinyl caprolatam.

| Formulation number | Pendulum Hardness |
| --- | --- |
| Std | 116 |
| 6A | 122 |
| 6B | 110 |
| 6C | 73 |

The results in Table 29 indicate that despite the material N-vinyl caprolactam being well known to those skilled in the art to be important for achieving good hardness properties in monofunctional type inkjet inks, it is possible to replace this material with the inventive material and maintain the desired hardness characteristics at all but the highest substitution levels, demonstrating excellent utility in inkjet inks.

Flexibility

The inks in Table 25 were printed onto a flexible vinyl substrate using a number 2 K bar and cured at a dose of 150 mJ under a medium pressure mercury arc lamp on a Fusion Microwave UV rig. The prints were then tested for their flexibility in a crease test where a convex hard crease is made in the substrate. If upon stretching of the print, there is no discoloration, lightening or whiteness around the crease, the test has been passed. If any discoloration, lightening or whiteness is observed, the test has been failed. Test results are reported in Table 30.

TABLE 30

Flexibilty results results for Magenta inkjet inks containing increasing levels of o-phenyl phenoxyethyl acrylate at the expense of the material N-vinyl caprolatam.

| Formulation number | Crease test |
|---|---|
| Std | FAIL |
| 6A | FAIL |
| 6B | PASS |
| 6C | PASS |

The results in Table 30 indicate that it is possible to replace N-VinylCaprolactam in a monofunctional type inkjet ink with the inventive material and make improvements to the flexibility.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A printing ink composition comprising a colorant and a monomer of polyethylene glycol o-phenyl phenyl ether acrylate of formula (A):

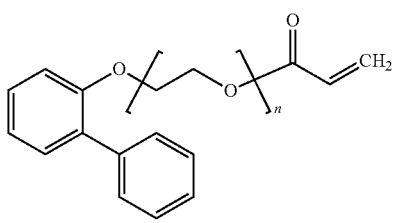

formula (A)

wherein, n is 1 - 3,
or a monomer of formula (I):

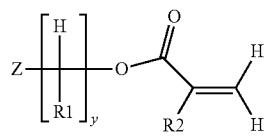

formula (I)

wherein:
$R^1$ is selected from the group consisting of hydrogen, methyl and a hydroxyl group;
$R^2$ is either a hydrogen or a methyl group;
y is 1 to 6; and
Z is selected from the group consisting of formula (II), (III) and (IV):

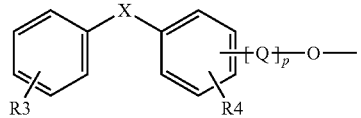

formula (II)

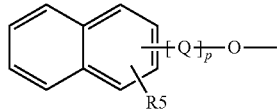

formula (III)

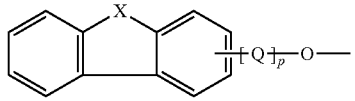

formula (IV)

wherein:
X is selected from the group consisting of a direct bond, O, $CH_2$, $C(CH_3)_2$ and C=O;
p is 0 or 1;
Q is $CH_2$ or C=O;
$R^3$ and $R^4$ are selected from the group consisting of H, phenyl, dimethyl benzyl, $C_1$-$C_8$ alkyl group and $C_1$-$C_8$ alkoxy group, or alternatively $R^3$ and $R^4$ are joined to form a fused ring with the benzene rings to which they are attached; and
$R^5$ is —C(O)O$R^6$, wherein $R^6$ is phenyl or $C_1$ - $C_8$ alkyl.

2. The printing ink composition of claim 1, wherein the monomer of formula (I) or formula (A) is o-phenyl phenoxyethyl acrylate:

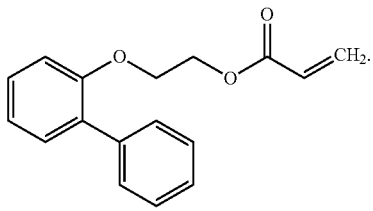 [SMILES: C=CC(=O)OCCOc1ccccc1-c1ccccc1]

3. The printing ink composition of claim 1, wherein the printing ink is a digital printing ink.

4. A digital printing ink composition comprising:
(a) the monomer of formula (A) or the monomer of formula (I) according to claim 1;
(b) a photoinitiator; and
(c) a colorant,
wherein, total photoinitiator content is from 1-15% by weight based on total weight of the ink.

5. A digital printing ink composition comprising the monomer of formula (A) or the monomer of formula (I) according to claim 1 present in an amount between 0.1-75% by weight of total weight of the ink.

6. A digital printing ink composition comprising the monomer of formula (A) or the monomer of formula (I) according to claim 1 present in an amount between 1-40% by weight of total weight of the ink.

7. A digital printing ink composition comprising the monomer of formula (A) or the monomer of formula (I) according to claim 1 present in an amount between 1-30% by weight of total weight of the ink.

8. A digital printing ink composition according to claim 1, wherein the ink is an aerosol jet ink.

9. A printed article comprising the printing ink composition of claim 1.

10. A method of printing a printing ink composition comprising applying to a substrate the printing ink composition of claim 1.

* * * * *